United States Patent
Genise

(10) Patent No.: US 6,205,389 B1
(45) Date of Patent: Mar. 20, 2001

(54) METHOD/SYSTEM FOR RESETTING THE VALUE OF A CONTROL PARAMETER INDICATIVE OF GROSS COMBINE WEIGHT OF VEHICLES TO A DEFAULT VALUE THEREOF

(75) Inventor: Thomas A. Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/397,328

(22) Filed: Sep. 16, 1999

(51) Int. Cl.$^7$ .................................................. F16H 59/52
(52) U.S. Cl. ............................... 701/51; 701/62; 477/900
(58) Field of Search .................................. 701/1, 51, 53, 701/55, 56, 62, 64, 65; 74/335; 477/900, 111

(56) References Cited

U.S. PATENT DOCUMENTS

| | | | |
|---|---|---|---|
| 5,272,939 | 12/1993 | Markyvech et al. | 447/120 |
| 5,335,566 | 8/1994 | Genise et al. | 477/124 |
| 5,487,005 | 1/1996 | Genise | 364/424.1 |
| 5,490,063 | 2/1996 | Genise | 364/424.1 |
| 5,491,630 | 2/1996 | Genise et al. | 364/424.1 |
| 6,116,105 | * 9/2000 | Genise et al. | 74/335 |

* cited by examiner

Primary Examiner—Tan Nguyen
(74) Attorney, Agent, or Firm—Howard D. Gordon

(57) ABSTRACT

A system/method of resetting the value of a control parameter ($GCW_{CP}$) indicative of vehicular gross combined weight and determined as a filtered/averaged value, to a predetermined default value upon sensing vehicle operating conditions (50% $GCW_{CP} < GCW_{TEST}$ or 200% $GCW_{CP} > GCW_{TEST}$) deemed indicative of a change in vehicle loading. A vehicle automated system, such as an automated mechanical transmission system, is controlled as a function of the value of the control parameter.

10 Claims, 4 Drawing Sheets

METHOD/SYSTEM FOR RESETTING THE VALUE OF A CONTROL PARAMETER INDICATIVE OF GROSS COMBINE WEIGHT OF VEHICLES TO A DEFAULT VALUE THEREOF

BACKGROUND OF THE INVENTION

1. Field of Invention

This invention relates to systems/methods for determining a value indicative of vehicular gross combined weight (GCW) in vehicles equipped with automated transmission systems or manual transmission systems and electronic data links. In particular, the present invention relates to a system/method for determining the GCW of vehicles, such as heavy-duty trucks or coaches equipped with an electronic databus carrying engine torque and other information, such as a databus conforming to the CAN, SAE J1922 and/or SAE J1939 protocol, wherein the control parameter indicative of GCW is a filtered, averaged value, often an average of 500 or more individual determination iterations, to minimize the effects of driveline torsionals, noise and the like. More particularly, the present invention relates to a GCW value determination method/system wherein the GCW control parameter is a filtered, averaged value and wherein the GCW control parameter value is reset to a default value thereof upon sensing that the current highly filtered value for GCW may be inaccurate.

2. Description of the Prior Art

In a heavy-duty truck or tractor-semitrailer vehicle, vehicle GCW may vary in a range of from about 10,000 pounds up to about 80,000 pounds or more, depending upon vehicle type and load. It is highly desirable to inform the vehicle operator of at least approximate current GCW and/or to provide this information to vehicle systems such as, e.g., an automated transmission system, a fleet management system, a variable suspension system, an onboard central tire inflation system (CTIS), an antilock brake system (ABS) or the like.

It is known in the prior art to provide various scale systems for vehicles wherein a control parameter indicative of vehicle weight, or at least of the weight of the vehicle load, may be measured. See, e.g., U.S. Pat. Nos. 4,714,122; 4,728,922; 5,014,206 and 4,839,835, the disclosures of which are incorporated herein by reference.

These systems required scale or other weighing systems which were costly to provide and/or maintain and were best suited for vehicles, such as garbage trucks or dump trucks, involved in special haulage applications, such as commercial refuse disposal or the like.

Methods/systems for calculating GCW as a function of engine/drivewheel torque and vehicle acceleration, as read from signals on a data link and/or outputted by various sensors, are known in the prior art. In one example, the GCW of a vehicle may be determined from known drive train characteristics (transmission ratio, axle ratio, tire radius, etc.), engine torque and vehicle acceleration measured at time $t_1$ and $t_2$ if $t_1$ and $t_2$ are relatively close (within seconds). This may be expressed as:

$$GCW = (T_1 - T_2) \div ((A_1 \cdot A_2) \times C)$$

where: $T_i$=Wheel torque at time $t_i$;
$A_i$=Vehicle acceleration at time $t_i$; and
C=Wheel rolling radius÷gravity constant.

To minimize the effects of drivetrain torsionals, noise and the like, GCW is, preferably, determined during or immediately after completion of an upshift and the control parameter GCWCP is a running, filtered average of many individual iterations of GCW determination. While the above-described methods/systems are very effective, they are not totally satisfactory as, in certain circumstances, they may not be as responsive as desired to situations wherein vehicles have stopped to change their loading, such as, for example, by adding or unloading cargo, connecting or disconnecting a semitrailer taking on or discharging coach passengers, or the like.

Automated vehicular systems using GCW as a control parameter and/or having logic for determining GCW may be seen by reference to U.S. Pat. Nos. 5,272,939; 5,335,566; 5,487,005 and 5,490,063, the disclosures of which are incorporated herein by reference.

A system for resetting the highly filtered value of GCW upon sensing conditions indicative of (i) the vehicle being at rest and/or the highly filtered value (GCWCP) differing from a less-filtered test value (GCWTEST) by greater than a predetermined value may be seen by reference to U.S. Pat. No. 5,491,630, the disclosure of which is incorporated herein by reference.

While an improvement over previous systems, the system described in U.S. Pat. No. 5,491,630 was subject to improvement, as it occasionally reset the GCW estimate when not necessary, did not always reset when required and/or reset to a test value which might not be desirable.

SUMMARY OF THE INVENTION

In accordance with the present invention, the drawbacks of the prior art are minimized or eliminated by the provision of a system/method for determination of vehicular GCW wherein the value of the control parameter outputted by the system as indicative of vehicular gross combined weight (GCWCP) is a relatively highly filtered, averaged value of a large number of previous (GCWi) determination iterations, and said value is reset to a preselected/predetermined default value upon the occurrence of conditions associated with probable vehicle change of load.

The foregoing is accomplished in a system/method for determining the value of a control parameter GCWCP indicative of vehicular GCW as a relatively highly filtered, averaged value of previous GCW determination iterations by (1) selecting/ determining a default value for said value, (2) calculating a test GCW value (GCWTEST) alongside the estimated GCW value (GCWCP), the test value being much less filtered and calculated on virtually every upshift, (3) comparing the estimated value to the test value to determine if the test value is within a given percentage of the estimated value $(((0.5)(GCW_{CP})) < GCW_{TEST} < ((2.0)(GCW_{CP})))$? and, if not, causing said value to be reset to the default value thereof. Preferably, the default value of GCW is equal to a relatively large GCW for the vehicle.

The default value will be selected with a view toward the system or systems using GCW as a control parameter. For example, in an automated mechanical transmission system wherein the transmission is controlled, at least in part, as a function of the value of the GCW control parameter, selecting a relatively large default value will tend to result in errors wherein shifting is somewhat aggressive, which is considered to be more desirable than errors wherein a shift expected and desired by the operator is not attempted.

Accordingly, it is an object of the present invention to provide an improved system/method for determination of the value of a control parameter GCWCP indicative of vehicular GCW as an average of current and multiple GCW determination iterations wherein the value of the control parameter will reset to a predetermined default value upon sensing the occurrence of a set of vehicle operating conditions predetermined to be indicative of vehicle load changes.

This and other objects and advantages of the present invention will become apparent from a reading of the detailed description of the preferred embodiment taken in connection with the attached drawings.

DESCRIPTION OF THE PREFERRED EMBODIMENT

Certain terminology will be used in the following description for convenience in reference only and will not be limiting. The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed. The term "upshift" as used herein, shall mean the shifting from a lower speed gear ratio into a higher speed gear ratio.

For purposes of illustration, the vehicular GCW determination method/system of the present invention is disclosed as associated with a vehicular drivetrain including an automated mechanical transmission and an electronically controlled engine having a CAN, SAE J1922 or SAE J1939 type data link. It is understood that the vehicular GCW determination system/method of the present invention also may be advantageously utilized with other types of vehicular drivetrain systems.

Figures 1, 1A:
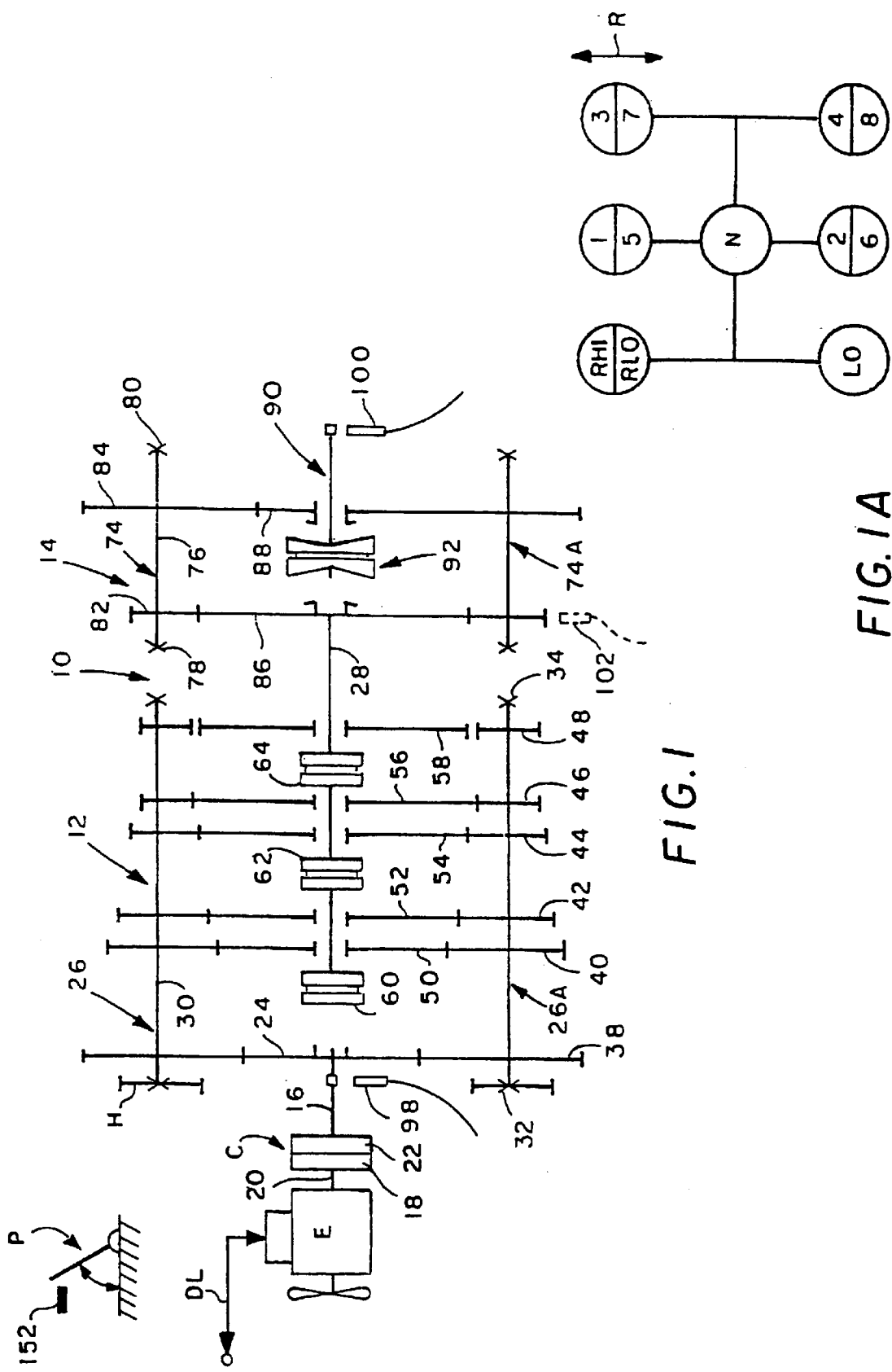
FIG. 1 is a schematic illustration of a vehicular drivetrain including a mechanical transmission, an electronic data link and an electronically controlled engine of the type advantageously utilizing the system/method of the present invention.
FIG. 1A is a schematic illustration of the shift pattern of the transmission of FIG. 1.

Referring to FIG. 1, a vehicle drivetrain including a range-type compound transmission 10 and an electronically controlled internal combustion engine E is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J1922 and/or SAE J1939 protocol, and the master clutch C may be manually controlled by a clutch pedal (not shown) or the like. Master clutch C, if used in fully automatic transmission systems, may be automatically controlled, see U.S. Pat. Nos. 4,081, 065 and 4,361,060, the disclosures of which are incorporated herein by reference. Alternatively, fuel modulation (as disclosed in U.S. Pat. No. 4,850,236) may be utilized for shifting without releasing the master clutch. Typically, electronically controlled engine E will be provided with its own electronic control unit ECUe. An input shaft brake (not shown) may be provided to provide quicker manual upshifting as is well known in the prior art. It is understood that a data link or databus, DL, complying with SAE J1939 protocol, or similar protocol, will carry information indicative of engine torque, engine speed and transmission output shaft speed.

Transmissions similar to mechanical transmission 10 are well known in the prior art and may be appreciated by reference to U.S. Pat. Nos. 3,105,395; 3,283,613 and 4,754, 665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Figure 2:
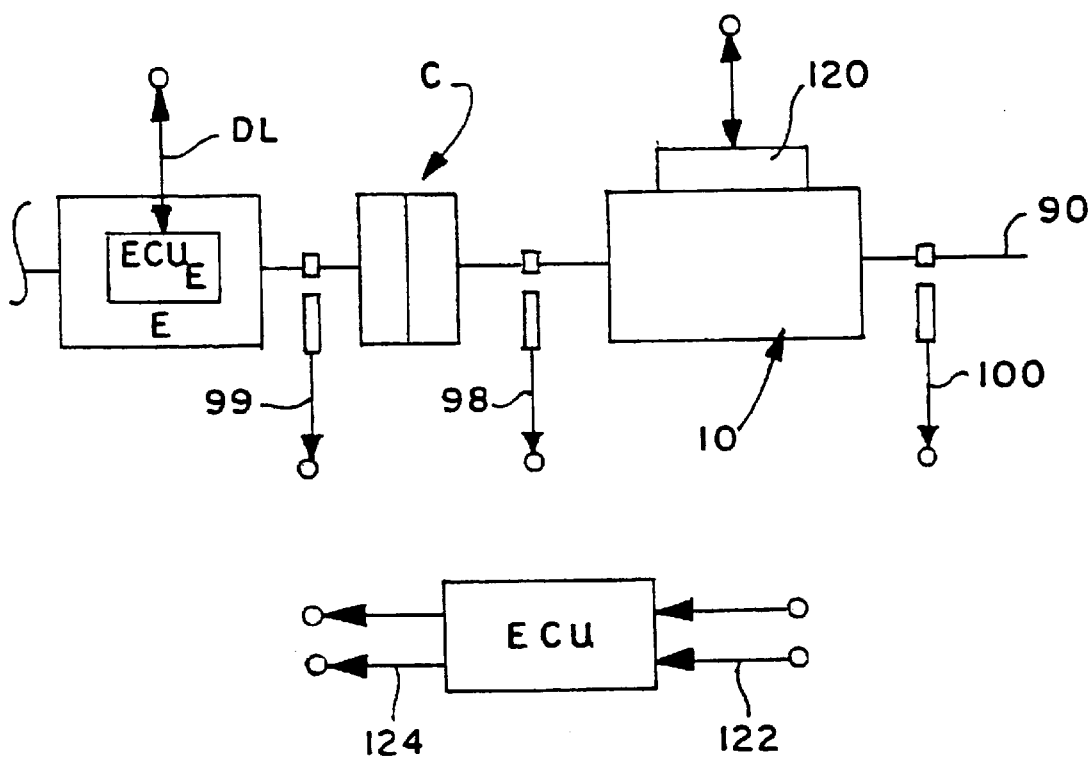
FIG. 2 is a schematic illustration of an automated shift implementation system advantageously utilizing the system/method of the present invention.

Typically, clutch collars 60, 62 and 64 are axially positioned by means of shift forks associated with the shift bar housing assembly 70, as well known in the prior art. Clutch collars 60, 62 and 64 may be of the well known nonsynchronized double acting jaw clutch type. As is well known, the clutch collars are shifted forwardly and rearwardly by shift forks controlled by transmission actuator 120 (see FIG. 2) of the type illustrated in U.S. Pat. Nos. 4,873,881 and 4,936,156, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) may be provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. A. Actuator 120, preferably, also will control the range section.

For purposes of determining vehicular GCW and/or for providing information to various vehicle systems, an input shaft speed sensor 98, an engine speed sensor 99 and/or an output shaft speed sensor 100 may be utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. Engine speed and/or output shaft speed information preferably is carried on the data link DL. As is well known (see above-mentioned U.S. Pat. No. 4,361,060), the signals (OS) from speed sensor 100 or other sensors may be differentiated with respect to time to provide signals (dOS/dt) having a value indicative of vehicle acceleration and the like. The ECU 106 will, preferably, include logic elements or rules for differentiating various input signals with respect to time.

The ECU 106 may be of the type illustrated in U.S. Pat. No. 4,595,986, the disclosure of which is incorporated herein by reference. The ECU is effective to process the inputs 122 in accordance with predetermined logic rules to issue command output signals 124 to the engine ECU (ECUE) and to actuator 120 and/or to a display unit and/or to other systems, such as an ABS system or a CTIS system or the like. As an alternative, a separate ECU for GCW determination may be provided or the logic rules for determining vehicle GCW may be in the engine ECU (ECUE) or another system ECU.

Output shaft speed sensor 100 may be replaced by a wheel speed signal from an ABS system and/or by sensors indicating input shaft speed and transmission gear ratio (ES=IS=OS*GR) and/or by a signal indicative of vehicle speed such as from the vehicle speedometer. Input shaft speed (IS) may be taken as equal to engine speed (ES), available on datalink DL, when clutch C is fully engaged. Gear ratio (GR) may be determined from position sensors or the like associated with the actuator 120, or may be calculated from output shaft and input shaft speed (GR=IS/OS). By way of example, engaged gear ratio may be determined when ES (=IS) equals OS*GR, for a known GR, over a predetermined period of time. Similarly, output shaft speed may be determined from input shaft speed and gear ratio (OS=IS/GR).

According to the present invention, a system/method is provided for determining vehicular GCW using existing information from an electronic engine (SAE J1922 or J1939 protocol) data link and/or using information from various sensors such as, for example, signals indicative of engine/drivewheel torque and a signal indicative of vehicle or output shaft speed.

In a preferred embodiment, it can be mathematically proven that for two times, t1 and t2, that are close to each other (within seconds):

$$T_1 - T_2 = C \times W \times (A_1 - A_2)$$

where: $T_i$=*Wheel torque at time $t_i$*;
  C=Rolling radius/gravity constant;
  W=Gross combination weight; and
  $A_i$=Vehicle acceleration at time $t_i$.

The proof of this relationship may be seen by reference to aforementioned U.S. Pat. No. 5,491,630. Based upon this relationship, a value closely approximating (within about 2,000–3,000 pounds) GCW may be determined from the expression:

$$GCW = W = (T_1 - T_2) \div ((A_1 - A_2) * C)$$

Also, to minimize errors, a plurality of GCW values is determined with $GCW_{CP}$ equaling an average:

$$GCW_{CP} = \frac{\sum_{i \geq 2}^{i} ((T_1 - T_i) \div ((A_1 - A_i) * C))}{(i - 1)}$$

It has been found that more accurate determinations of GCW may be obtained at completion of an upshift, especially if time $t_1$ is selected at the instant during an upshift immediately prior to engagement of the new ratio. At this instant, $T_1$, torque supplied from the engine to the drivewheels, is zero, and vehicle acceleration $A_1$ is a relatively low, possibly negative, value. Times $t_2, t_3 \ldots t_i$ may then be any point after engine power is sufficiently applied to the drivewheels through the vehicle powertrain for up to four seconds after time $t_1$.

In practice, a new $GCW_i$ is calculated about every 40 milliseconds after $t_2$ until about four seconds after $t_1$. Preferably, the $GCW_i$ values are then summed and averaged. The filtering/averaging technique adjusts for errors in each individual iteration due to torsionals, noise and the like which may render individual iterations of GCW relatively inaccurate. When the counter reaches 1,000, the sum is divided in half, the counter set to 500, and the averaging continues. This will provide a filtering of the GCW value.

$$GCW_{CP} = \frac{[GCW_i + (499 * GCW_{CP})]}{500}$$

According to a preferred embodiment, after time $t_1$, when the initial $A_1$ value is sensed, values of $A_2 \ldots i$ and $T_2 \ldots i$ will not be sensed until certain conditions are met, assuring that the subsequent values are different enough in magnitude from the time t1 values to provide valid calculations for GCW. These conditions, determined from on-vehicle testing, are:

(1) t1 is less than four seconds after ti;
(2) the engine is operating at greater than a reference torque (about 19 percent of peak torque);
(3) vehicle acceleration is greater than a reference value (dOS/dt>about 20 RPM/sec.);
(4) input shaft speed greater than a reference value (IS>about 1,200 RPM for a heavy-duty diesel engine);
(5) vehicle acceleration has changed; and
(6) a shift is not in progress.

In practice, to get Ti, the drivewheel torque at time ti, the engine torque is sensed, preferably from the electronic data link DL, and used to derive the drivewheel torque in a known manner. Generally, torque at the drivewheels may be determined from the following:

Torque at wheels=(engine torque)*(gear ratio)*(axle ratio)*(drivetrain efficiency);

where engine torque=[(percent engine torque)*(peak engine torque)]-[(torque to drive vehicle accessories)+(torque to accelerate engine)].

To achieve even greater accuracy, it is desirable to sense engine flywheel torque (TFW) from the relationship:

$$T_{FW}=T_{EG}-T_{BEF}-T_{ACCES}-T_{ACCEL}$$

where:

$T_{FW}$=engine flywheel torque;

$T_{EG}$=gross engine torque;

$T_{BEF}$=base engine friction torque (includes the torque to overcome engine internal friction and the torque to rotate the engine manufacturer-installed accessories (i.e., water pump, oil pump, etc.));

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment of inertia (I) of engine.

The control parameter GCW$_{CP}$ indicative of vehicular GCW is useful in determining feasibility of shifts in an automated transmission system, see U.S. Pat. Nos. 5,272,939; 5,241,476 and 5,172,609, the disclosures of which are incorporated herein by reference, as well as in fleet management systems, antilock brake systems (ABS), central tire inflation systems (CTIS), active suspension systems and the like.

While the above-described preferred method/system for determining the value of a control parameter indicative of vehicular GCW is highly effective, due to its averaging/filtering techniques (which are deemed necessary in view of heavy-duty vehicle drivetrain torsionals, noise and the like), the method/system, in certain circumstances, may not be as responsive to relatively large changes in vehicle loading as is desirable. Examples of relatively large changes in vehicle loading include loading or unloading (dumping) cargo, adding or dropping a trailer or semi-trailer, embarking or disembarking a group of coach passengers and the like.

This method does not correct very quickly; however, the GCW if the true vehicle GCW changes suddenly a large amount. Furthermore, the above GCW estimate algorithm has certain conditions under which a given upshift may be used to calculate GCW (i.e., shift duration must be long enough, cannot be on a steep grade/load, etc.). Because of this, if the true GCW changes drastically enough and then the vehicle shift algorithm (using a wrong GCW estimate) alters its shift behavior such that it "thinks" it is on a steep grade (due to the wrong GCW), it may make only short shifts (a 16-or 18-speed AutoShift) forever after and never calculate GCW again.

According to the present invention, the above problems are minimized by calculating a "test GCW" alongside the regular GCW. This "test GCW," however, gets calculated during nearly every upshift (some exceptions may apply, i.e., not short shifts in high range, etc.), regardless of shift duration or indicated grade/load. The "test GCW" is made up of an average of many estimates—just like the regular GCW—but the "test GCW sum" and the "test GCW sum count" get divided by two when the "test GCW sum count" reaches a much smaller value (such as 150). This provides a much lighter averaging filter for the "test GCW."

Figure 3A:
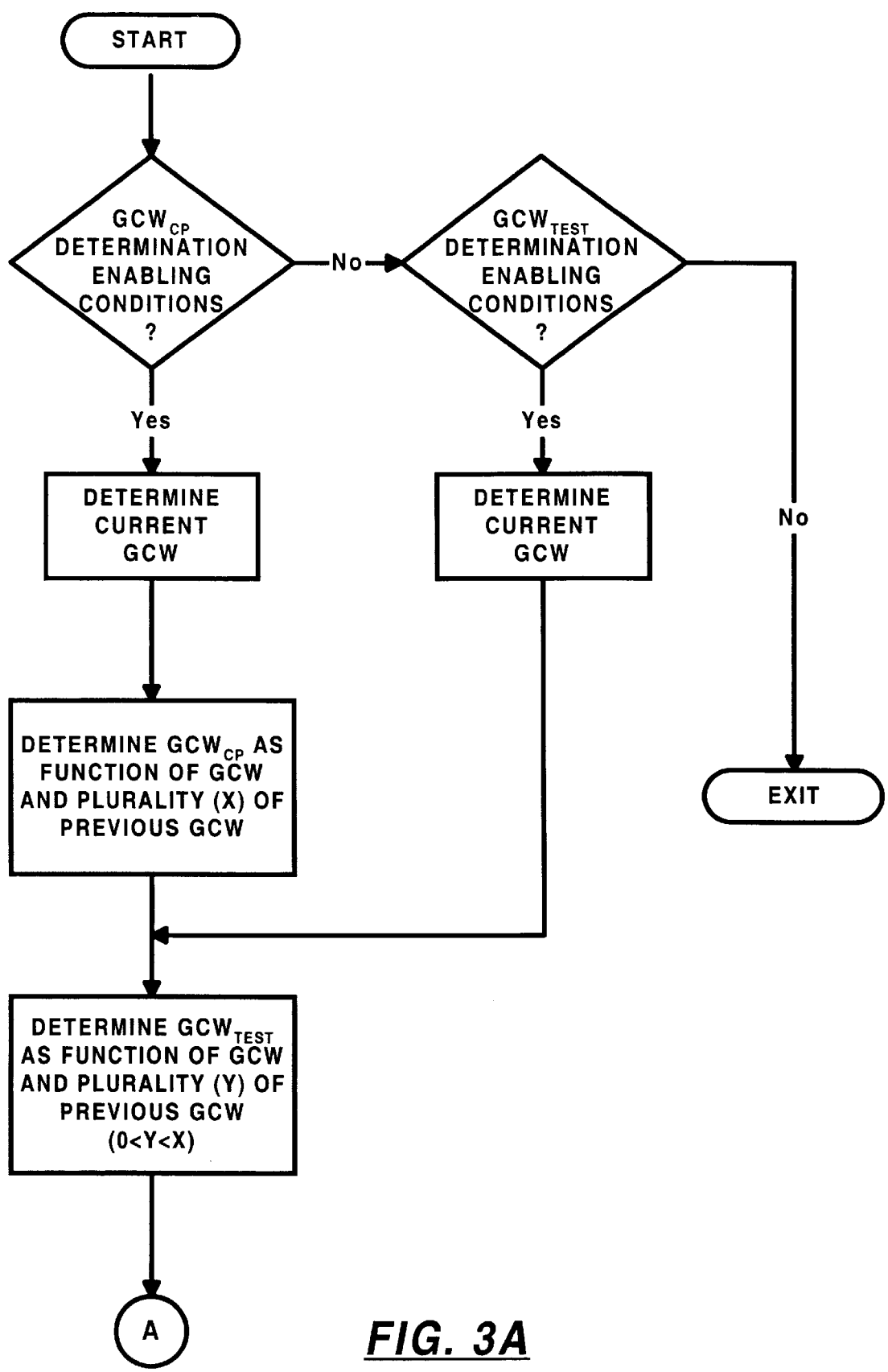
FIGS. 3A and 3B are a schematic illustrations, in flow chart format, of the GCW determination method of the present invention.
Figure 3B:
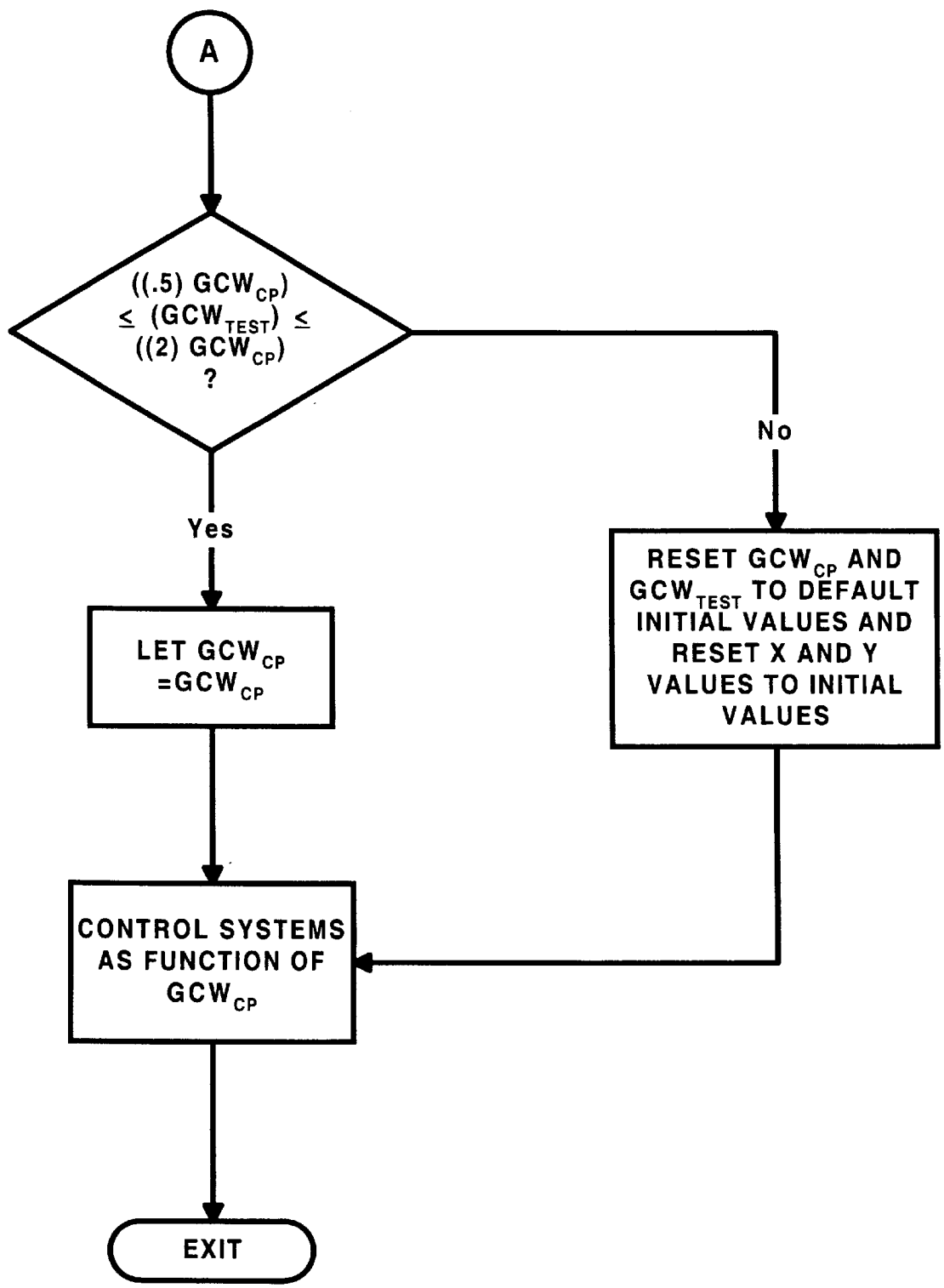

Then, if the "test GCW" is different than the "regular GCW" by a factor of two either way (test GCW is twice as large as GCW$_{CP}$ or test GCW is half of GCW$_{CP}$), both the GCW$_{CP}$ and the test GCW get "reset." Upon reset, both numbers get initialized to a value (usually a very large value), the GCW sum counters (test and regular) get set back to one, and the GCW sums (test and regular) get set to the initialized GCW value (usually very large). This embodiment of the present invention is illustrated in flow chart format in FIGS. 3A and 3B.

Although the present invention has been described with a certain degree of particularity, it is understood that various changes to form and detail may be made without departing from the spirit and the scope of the invention as hereinafter claimed.

I claim:

1. A control system for an automated vehicle system on a vehicle, said vehicle system including a controller for controlling said vehicle system as a function of input signals and predetermined logic rules, said control system comprising:

means for continuously determining current vehicular gross combined weight upon the occurrence of determination enabling conditions comprising:

means for determining a revised control parameter value (GCW$_{CP}$) indicative of current gross combined weight as a filtered average of a current and a predetermined first plurality of previous determinations of current vehicular gross combined weight;

means for determining a revised test value (GCW$_{TEST}$) of current vehicle gross combined weight as a filtered average of a current and a predetermined second plurality of previous determinations of current vehicular gross combined weight, said first plurality at least twice as great as said second plurality of determinations;

means for comparing said control parameter value to said test value;

means for setting said control parameter value to a predetermined default value independent of said control parameter value or said test value if said control parameter value is less than a first percentage of saia test value or greater than a second percentage of said test value; and means for causing said vehicle system to be controlled as a function of said control parameter value.

2. The control system of claim 1 wherein said automated system is an automated mechanical transmission system and said enabling conditions comprise completion of an upshift within a predetermined period of time.

3. The system of claim 2 wherein said revised control parameter value is determined only if engine braking is not active and said revised test value is determined, regardless of condition of the engine brakes.

4. The system of claim 1 wherein said first percentage is about 50% and said second percentage is about 200%.

5. The system of claim 1 wherein said revised control parameter value is determined only if engine braking is not active and said revised test value is determined, regardless of condition of the engine brakes.

6. A method for controlling an automated vehicle system on a vehicle, said vehicle system including a controller for controlling said vehicle system as a function of input signals and predetermined logic rules, said method comprising the steps of:

continuously determining current vehicular gross combined weight upon the occurrence of determination enabling conditions comprising:

determining a revised control parameter value ($GCW_{CP}$) indicative of current gross combined weight as a filtered average of a current and a predetermined first plurality of previous determinations of current vehicular gross combined weight;

determining a revised test value ($GCW_{TEST}$) of current vehicle gross combined weight as a filtered average of a current and a predetermined second plurality of previous determinations of current vehicular gross combined weight, said first plurality at least twice as great as said second plurality of determinations;

comparing said control parameter value to said test value;

setting said control parameter value to a predetermined default value independent of said control parameter value or said test value if said control parameter value is less than a first percentage of saia test value or greater than a second percentage of said test value; and causing said vehicle system to be controlled as a function of said control parameter value.

7. The method of claim 6 wherein said automated system is an automated mechanical transmission system and said enabling conditions comprise completion of an upshift within a predetermined period of time.

8. The method of claim 7 wherein said revised control parameter value is determined only if engine braking is not active and said revised test value is determined, regardless of condition of the engine brakes.

9. The method of claim 6 wherein said first percentage is about 50% and said second percentage is about 200%.

10. The method of claim 6 wherein said revised control parameter value is determined only if engine braking is not active and said revised test value is determined, regardless of condition of the engine brakes.

* * * * *